US012758012B2

(12) United States Patent
Oh et al.

(10) Patent No.: US 12,758,012 B2

(45) Date of Patent: Oct. 13, 2026

(54) COSMETIC CABINET

(71) Applicant: BONJIL, LLC, Atlanta, GA (US)

(72) Inventors: Edward Oh, Atlanta, GA (US); Chang Hee Cho, Atlanta, GA (US)

(73) Assignee: BONJIL, LLC, Atlanta, GA (US)

( * ) Notice: Subject to any disclaimer, the term of this patent is extended or adjusted under 35 U.S.C. 154(b) by 55 days.

(21) Appl. No.: 18/775,962

(22) Filed: Jul. 17, 2024

(65) Prior Publication Data

US 2025/0302193 A1 Oct. 2, 2025

(30) Foreign Application Priority Data

Apr. 1, 2024 (KR) ........................ 10-2024-0044281

(51) Int. Cl.

| | |
|---|---|
| ***A47B 83/00*** | (2006.01) |
| ***A47B 67/00*** | (2006.01) |
| ***F25D 11/00*** | (2006.01) |
| ***G10F 1/06*** | (2006.01) |

(52) U.S. Cl.

CPC ............ *A47B 83/00* (2013.01); *A47B 67/005* (2013.01); *F25D 11/00* (2013.01); *G10F 1/06* (2013.01); *A47B 2220/0072* (2013.01); *A47B 2220/0077* (2013.01)

(58) Field of Classification Search

CPC ....... A47B 67/005; A47B 67/02; A47B 67/04; A47B 83/00; A47B 88/00; A47B 84/00; A47B 2200/0077; A45C 5/005; A45C 11/16; A45C 15/00; A45C 15/06; F25D 11/00; F25D 23/12; G10F 1/06; A47F 7/00; A47F 7/02

USPC .... 312/116, 224, 236, 311, 326, 330.1, 400; 84/94.1, 94.2, 95.1, 95.2, 96; 206/6.1, 206/566; 446/309, 310, 311, 404

See application file for complete search history.

(56) References Cited

U.S. PATENT DOCUMENTS 2,252,288 A * 8/1941 Kind ......................... G10F 1/06 84/94.1

2,488,035 A * 11/1949 Pistone .................. A47B 81/04 312/304

5,422,429 A * 6/1995 Shih .......................... G10F 1/06 446/482

(Continued)

FOREIGN PATENT DOCUMENTS

KR 20-0423138 Y1 8/2006

*Primary Examiner* — Daniel J Troy

*Assistant Examiner* — Elizabeth Irene Artalejo

(74) *Attorney, Agent, or Firm* — Bridgeway IP Law Group, PLLC; Sang Ho Lee; Hyun Woo Shin

(57) ABSTRACT

A cosmetic cabinet includes a casing defining an array space by a bottom plate, a back plate, a top plate, and side plates a door coupled to the casing through at least one hinge assembly configured to open and close the array space, a storage compartment including a drawer casing and a drawer slidable in the drawer casing under the array space, a light assembly including an LED module and a speaker equipped with a built-in short-range wireless communication module, a light storage housing disposed over the array space and coupled with the light assembly therein, a music box disposed in an internal space of the drawer and configured to operate when the internal space is opened by sliding the drawer, and a fixed magnetic body fixed to the drawer casing and controlling operation of the music box in accordance with a position of the drawer.

5 Claims, 13 Drawing Sheets

(56) References Cited

U.S. PATENT DOCUMENTS

| | | | | |
|---|---|---|---|---|
| 5,696,333 | A * | 12/1997 | Shih | A45C 15/00<br>84/95.2 |
| 8,282,227 | B2 * | 10/2012 | Massara | H05B 47/1985<br>362/249.02 |
| 2004/0178116 | A1 * | 9/2004 | Daetweiler | A47F 7/03<br>312/324 |
| 2007/0028854 | A1 * | 2/2007 | Chern | A01K 5/0114<br>119/753 |
| 2008/0278047 | A1 * | 11/2008 | Diemel | F25D 21/14<br>312/224 |
| 2020/0268148 | A1 * | 8/2020 | Kim | F25D 31/00 |
| 2024/0247863 | A1 * | 7/2024 | Passley | F25D 23/063 |
| 2025/0009146 | A1 * | 1/2025 | Lechner | H04R 1/025 |

* cited by examiner

COSMETIC CABINET

CROSS REFERENCE TO RELATED APPLICATION

The present application claims priority to Korean Patent Applications No. KR10-2024-0044281, filed on Apr. 1, 2024, the entire contents of which are incorporated herein for all purposes by this reference.

BACKGROUND

Technical Field

The present disclosure relates to a cosmetic cabinet, and in more detail, a cosmetic cabinet that has a music box therein to be able to create a novel atmosphere and can emit light or play music through a light unit integrated with a speaker when a door of the cabinet is opened.

Description of the Related Art

In general, a cosmetic cabinet is used to keep cosmetics that are used for makeup. In this case, the cosmetics on the top plate are exposed to the outside, so there may be a problem that bacteria, etc. propagate in the cosmetics or the ingredients of the cosmetics change due to variation of temperature of the surrounding space Further, since cosmetics are exposed to the surrounding environment, the cosmetics are easily exposed to the problem of collecting of dust or dropping to the floor from the top plate of the table, so there is a problem that the containers of the cosmetics are damaged or broken.

Further, there are cabinets equipped with a door for keeping cosmetics in the cabinets and operating in a way of opening the door, but these are generally provided only cabinets for simply keeping cosmetics and cannot provide a novel atmosphere to users.

Meanwhile, in order to solve these problems, as a prior art document, according to Korean Utility Model No. 20-0423138 (registered on 2006 Jul. 28, title of invention: A Closet Having Cosmetic Refrigerator), there has been disclosed a technology about a cosmetic closet "including: a closet body 11 having an upper storage compartment 12 formed at the upper portion and a lower storage compartment 11 formed at the lower portion; a closet door 2 hinged to a side of the closet body 10 and opening or closing the inside of the closet body 10; and a cosmetic refrigerator installed in the lower storage compartment 11 to keep cosmetics".

However, according to the patent document, it is possible to prevent deterioration of the components of cosmetics placed in the closet through the cosmetic refrigerator, but there is no configuration that can give pleasantness by providing music and configuration that emits light when a user uses the cosmetic closet.

Accordingly, there is still necessity for a cosmetic cabinet that has a music box therein to be able to create a novel atmosphere and can emit light or play music through a light unit integrated with a speaker when a door of the cabinet is opened.

SUMMARY

In order to solve the problems and necessity described above, an objective of the present disclosure is to provide a cosmetic cabinet that can create a novel environment through music because it has a music box therein.

Another objective of the present disclosure is to provide a cosmetic cabinet that can emit light or play music through a light unit integrated with a speaker when a door of the cabinet is opened.

Another objective of the present disclosure is to provide a cosmetic cabinet that uses an improved hinge to be able to easily support the weight of a door of the cosmetic cabinet when the door of the cosmetic cabinet is opened and closed.

The technical subject to implement in the present disclosure is not limited to the technical problems described above and other technical subjects that are not stated herein will be clearly understood by those skilled in the art from the following specifications.

In order to achieve the objectives described above, a cosmetic cabinet according to an embodiment of the present disclosure includes a casing that has an array space formed therein by a bottom plate, a back plate, a top plate, and side plates and in which cosmetics are arrayed or kept.

In this configuration, the cosmetic cabinet includes: a door unit coupled to the casing through hinge units and opening/closing the array space; and a storage unit including a drawer casing and a drawer that can slide in the drawer casing under the array space.

In this configuration, the cosmetic cabinet includes a light unit in which an LED module emitting light to the array space and a speaker equipped with a built-in Bluetooth module are integrated; and a light storage unit disposed over the array space and coupled with the light unit therein.

Further, the cosmetic cabinet includes: a music box disposed in an internal space of the drawer and operating when the internal space is opened by sliding the drawer; and a fixed magnetic body fixed to the drawer casing and controlling operation of the music box in accordance with the position of the drawer.

In this configuration, the cosmetic cabinet includes a refrigeration system providing cold air to the array space to maintain temperature and humidity of cosmetics arrayed or kept in the array space.

Meanwhile, a partition plate partially dividing the array space is disposed in the array space and a mirror is disposed on each of a front surface of the partition wall and an inner surface of the door unit.

In this configuration, the music box includes a power transmitter that is rotated by power transmitted through a power generator, a drum that is rotated by power transmitted through the power transmitter, a player that is operated in contact with the drum, and a stopper that limits power that is transmitted to the drum by stopping operation of the power transmitter.

Further, the stopper includes a supporting plate, an elastic plate extending from an end of the supporting plate and being perpendicular to the supporting plate, a coupling plate coupled to an end of the elastic plate and coupled with a moving magnetic body being movable forward and backward by the fixed magnetic body, and a moving plate extending from an end of the coupling plate and being parallel with the supporting plate.

In this configuration, the fixed magnetic body and the moving magnetic body have the same pole, so when the fixed magnetic body and the moving magnetic body come close to each other, the moving magnetic body can be moved forward by magnetic force of repulsion; and when the moving magnetic body is moved forward, the moving plate is moved forward, whereby operation of the power transmitter is stopped.

In this configuration, the magnetic force of repulsion is larger than a restoring force of the elastic plate, so when the fixed magnetic body and the moving magnetic body come close to each other, an upper portion of the elastic plate is moved forward, whereby the moving magnetic member can be moved forward.

In this configuration, the light unit further includes an opening/closing sensing module that senses opening and closing of the door, so the LED module and the speaker are operated only when the door unit is opened.

Further, the opening/closing sensing module includes a first member disposed at an upper end of the door unit and a second member disposed at a lower end of the light storage unit close to the first member, so opening of the door unit is determined when the door unit is opened and the first member and the second member are moved away from each other.

In this configuration, the hinge unit includes, in a pair, hinge bodies embedded in the side plate and the door unit, respectively, to couple the side plate and the door unit to each other, and a rotary member rotatably coupled to the hinge bodies.

In this configuration, the hinge body includes a main body and wing bodies extending from an upper end and a lower end of the main body.

Further, the main body has a first hinge rotation shaft to which a first end of the rotary member is rotatably coupled; and the wing body has a second hinge rotation shaft to which a second end of the rotary member is rotatably coupled.

In this configuration, the rotary member includes a base body having a first through-hole to be coupled to the first hinge rotation shaft and one or more sub-body extending from an end of the base body and having a second through-hole to be coupled to the second hinge rotation shaft.

Meanwhile, the hinge unit has an assistant hinge including a first coupling member coupled to an inner surface of an upper end portion of the door unit, a first hinge plate having a first end coupled to the first coupling member, a second hinge plate having a first end coupled to a second end of the first hinge plate, and a second coupling member coupled to a bottom of the light storage unit and coupled to a second end of the second hinge plate.

Therefore, according to the cosmetic cabinet of the present disclosure, it is possible to provide a cosmetic cabinet that can create a novel atmosphere through music, which is played by a music box, because the music box is accommodated therein, and can emit light or play music through a light unit integrated with a speaker when a door of the cabinet is opened.

BRIEF DESCRIPTION OF THE DRAWINGS

The accompanying drawings of this specification exemplify preferred embodiments and help easy understanding of the present disclosure together with the following detailed description, so the present disclosure should not be construed as being limited to the drawings.

DETAILED DESCRIPTION

Figure 1:
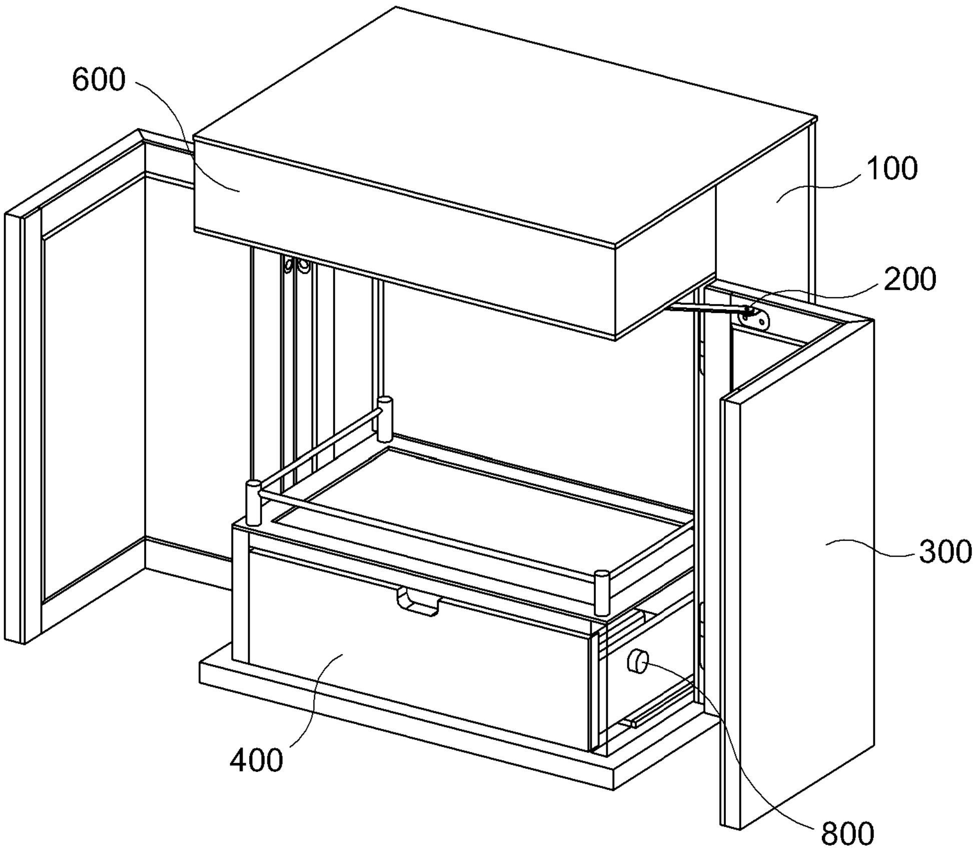
FIG. 1 to FIG. 4 are views illustrating the entire configuration of a cosmetic container according to a preferred embodiment of the present disclosure.
Figure 2:
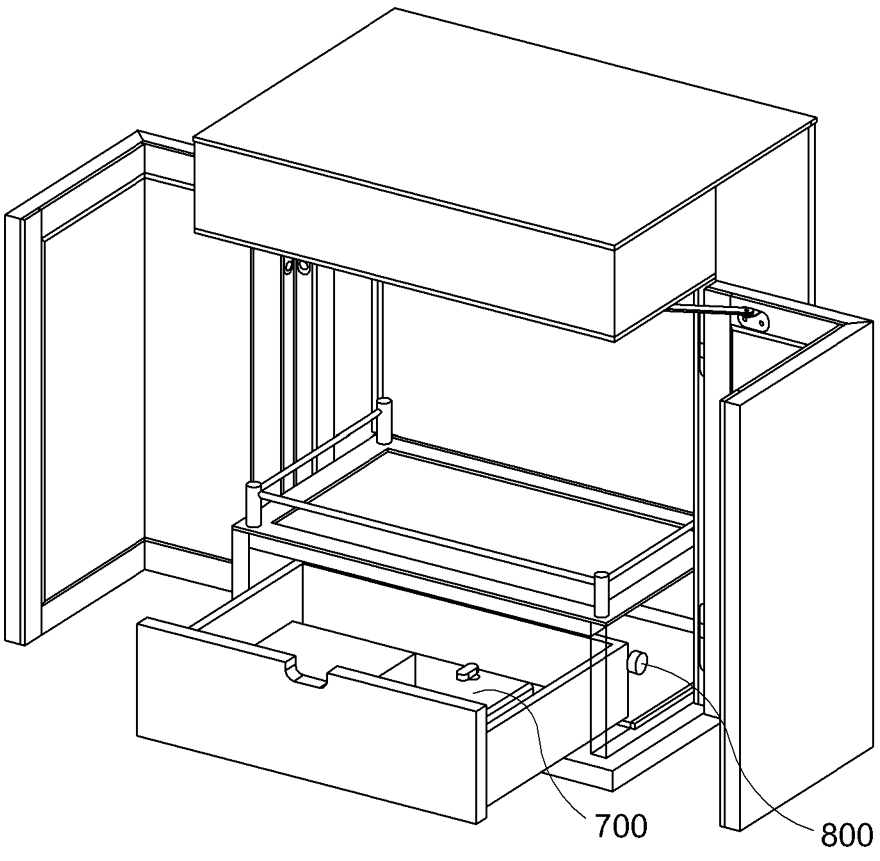
Figure 3:
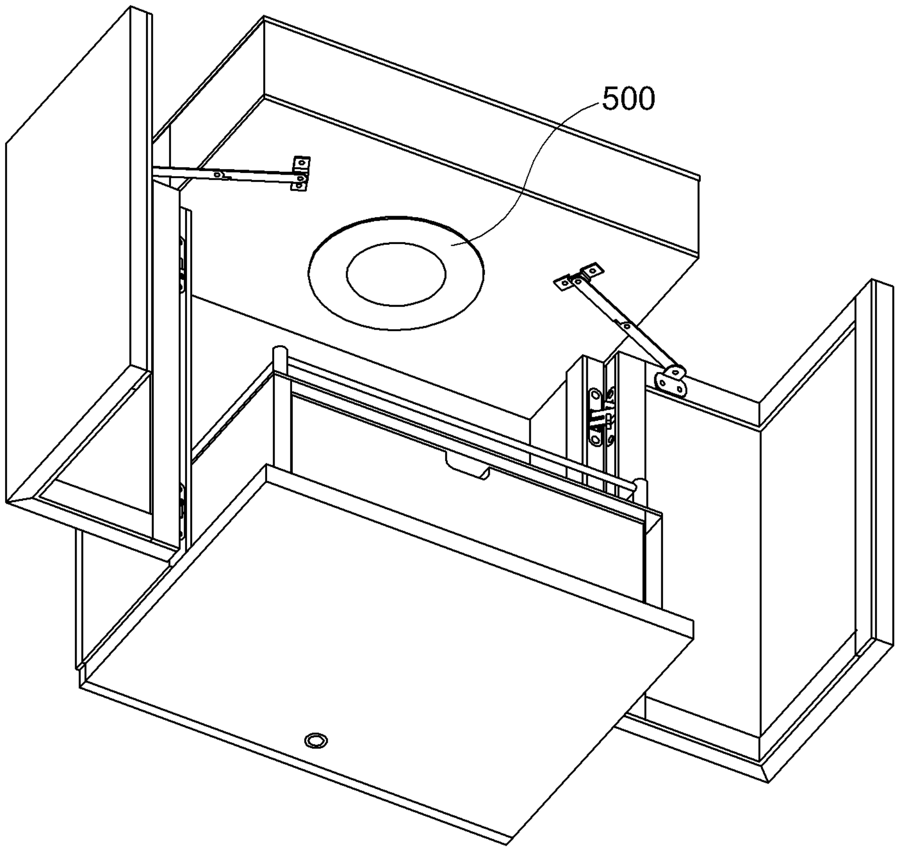
Figure 4:
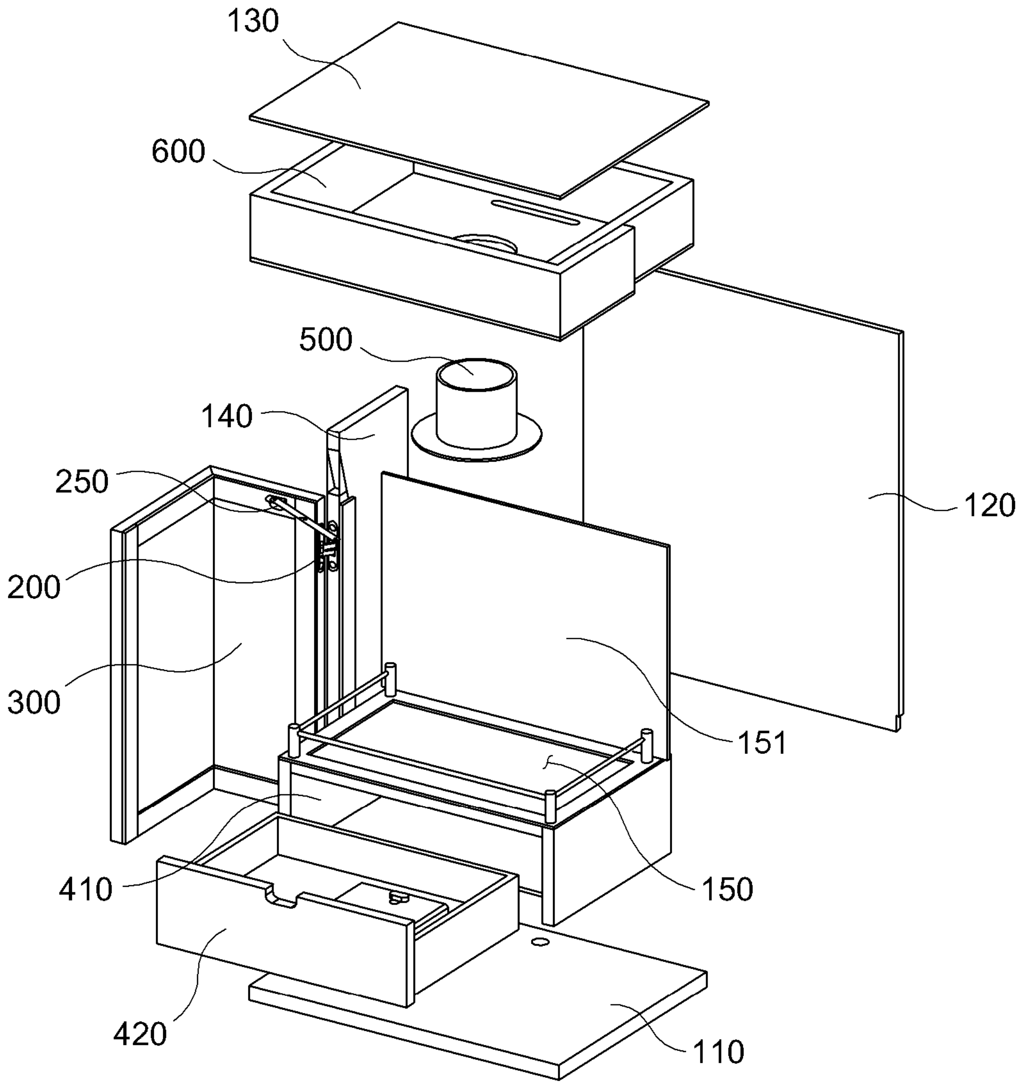

Specific structural and functional description about embodiments according to the concept of the present disclosure disclosed herein is exemplified only to describe the embodiments according to the concept of the present disclosure and the embodiments according to the concept of the present disclosure may be implemented in various ways and are not limited to the embodiments described herein.

Embodiments described herein may be changed in various ways and various shapes, so specific embodiments are shown in the drawings and will be described in detail in this specification. However, it should be understood that the exemplary embodiments according to the concept of the present disclosure are not limited to the specific examples, but all of modifications, equivalents, and substitutions are included in the scope and spirit of the present disclosure.

Figure 5:
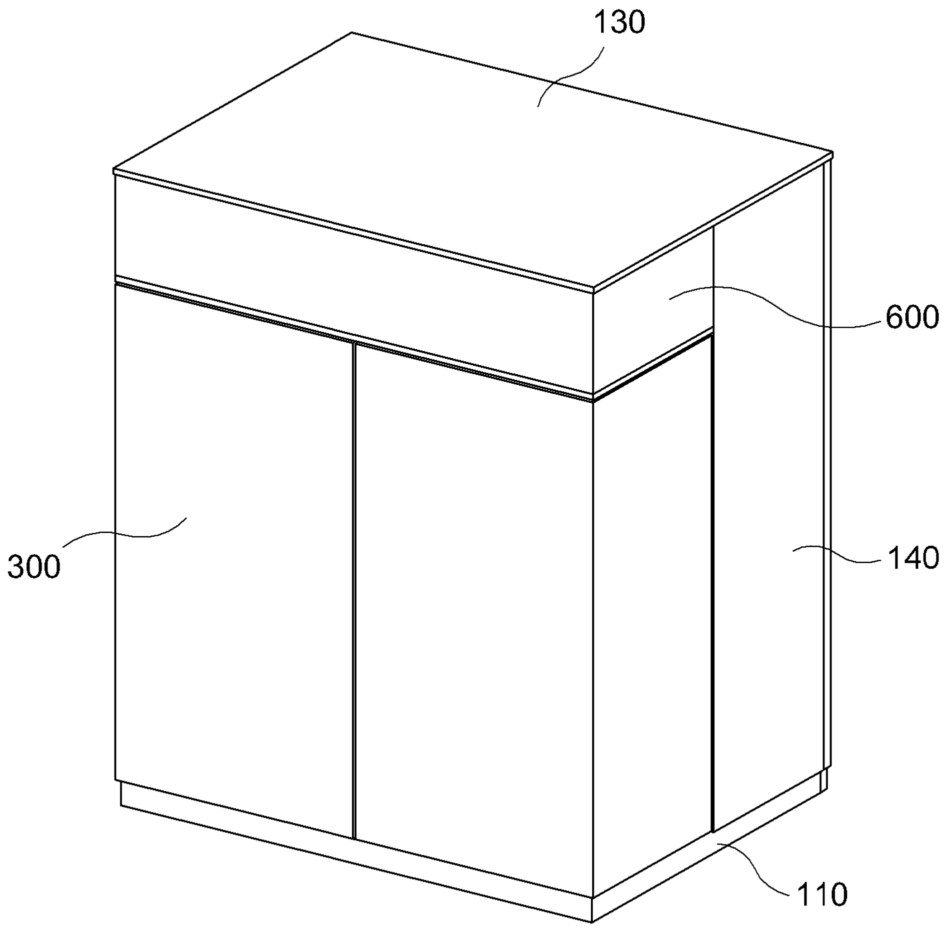
FIG. 5 is a view illustrating a casing of the cosmetic container according to a preferred embodiment of the present disclosure.
Figure 6:
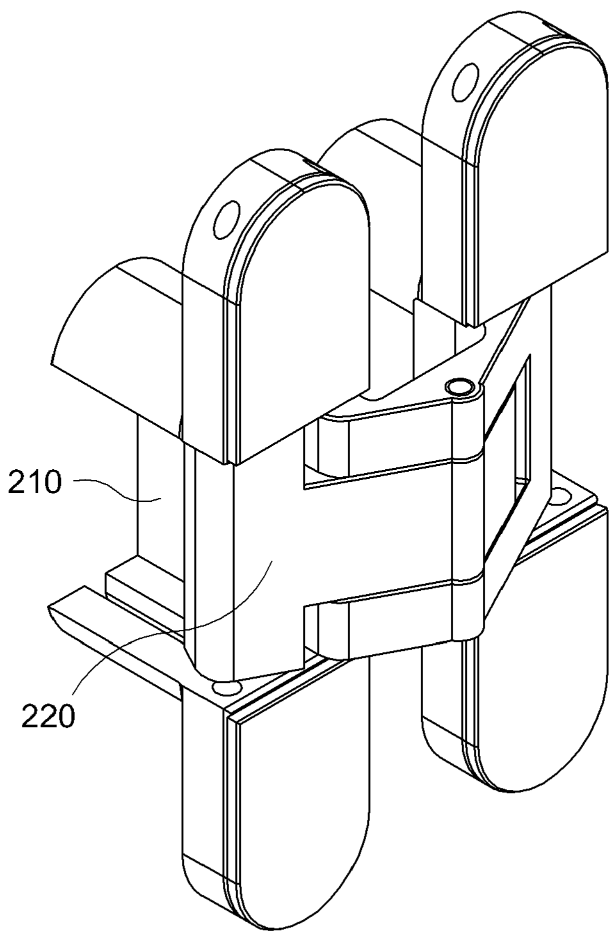
FIG. 6 to FIG. 12 are views illustrating a hinge unit of the cosmetic container according to a preferred embodiment of the present disclosure.
Figure 7:
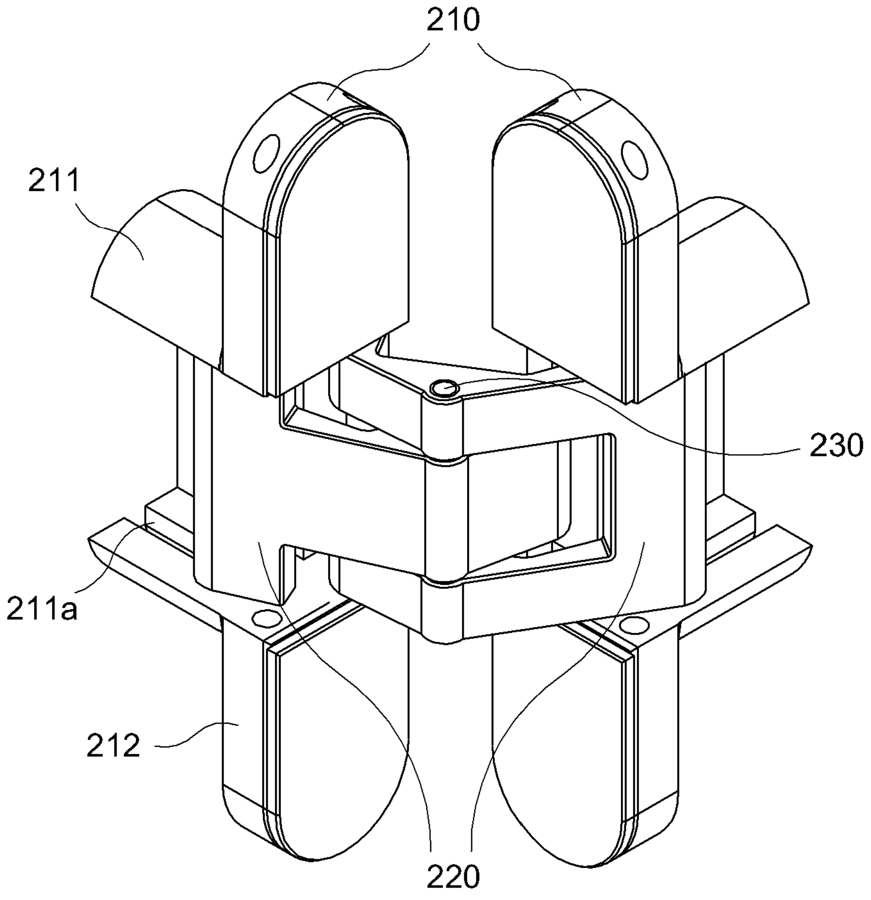
Figure 8:
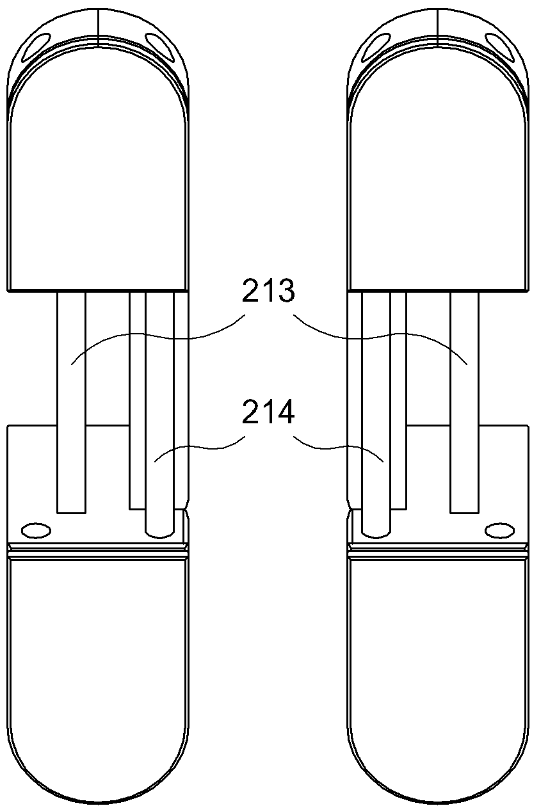
Figure 9:
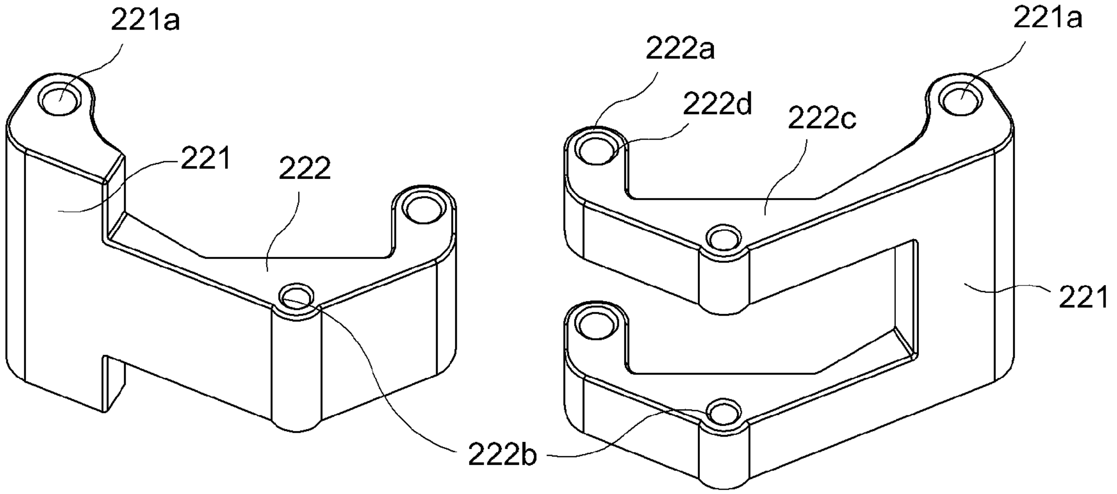
Figure 10:
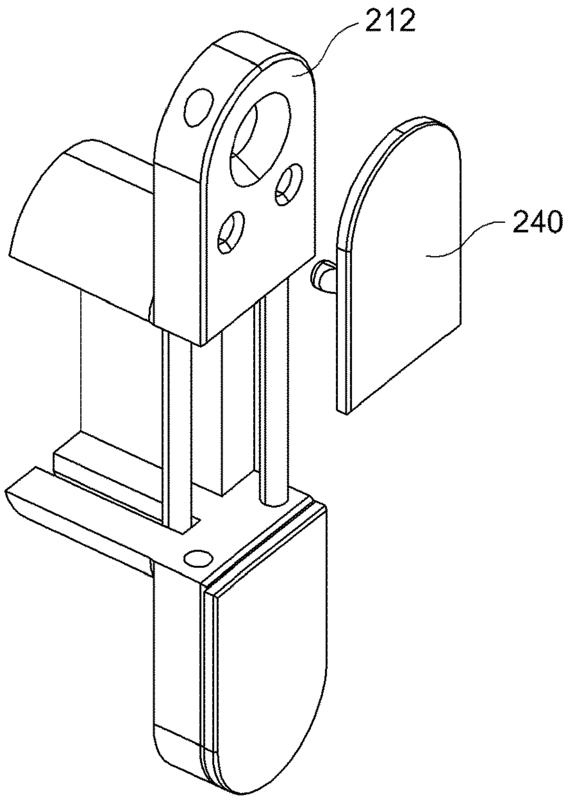
Figure 11:
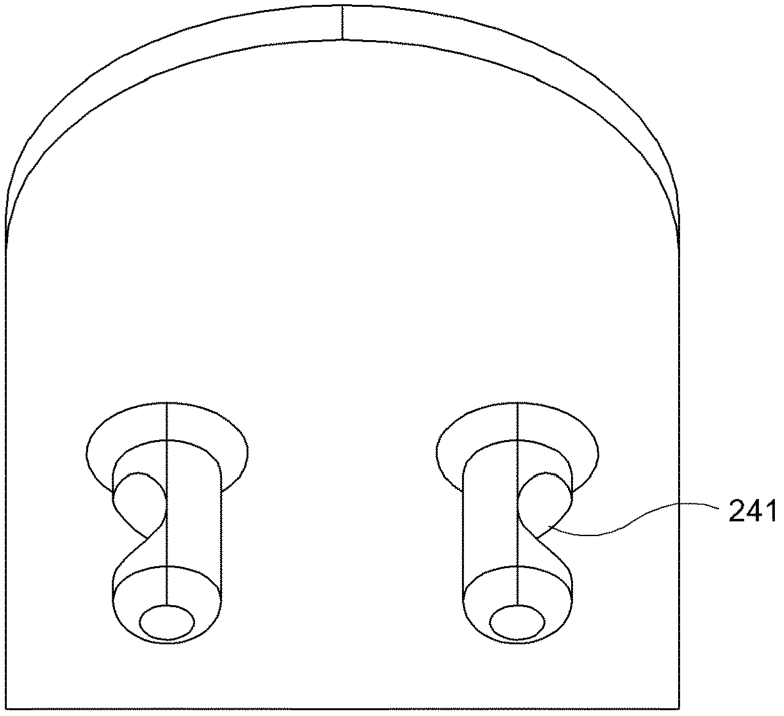
Figure 12:
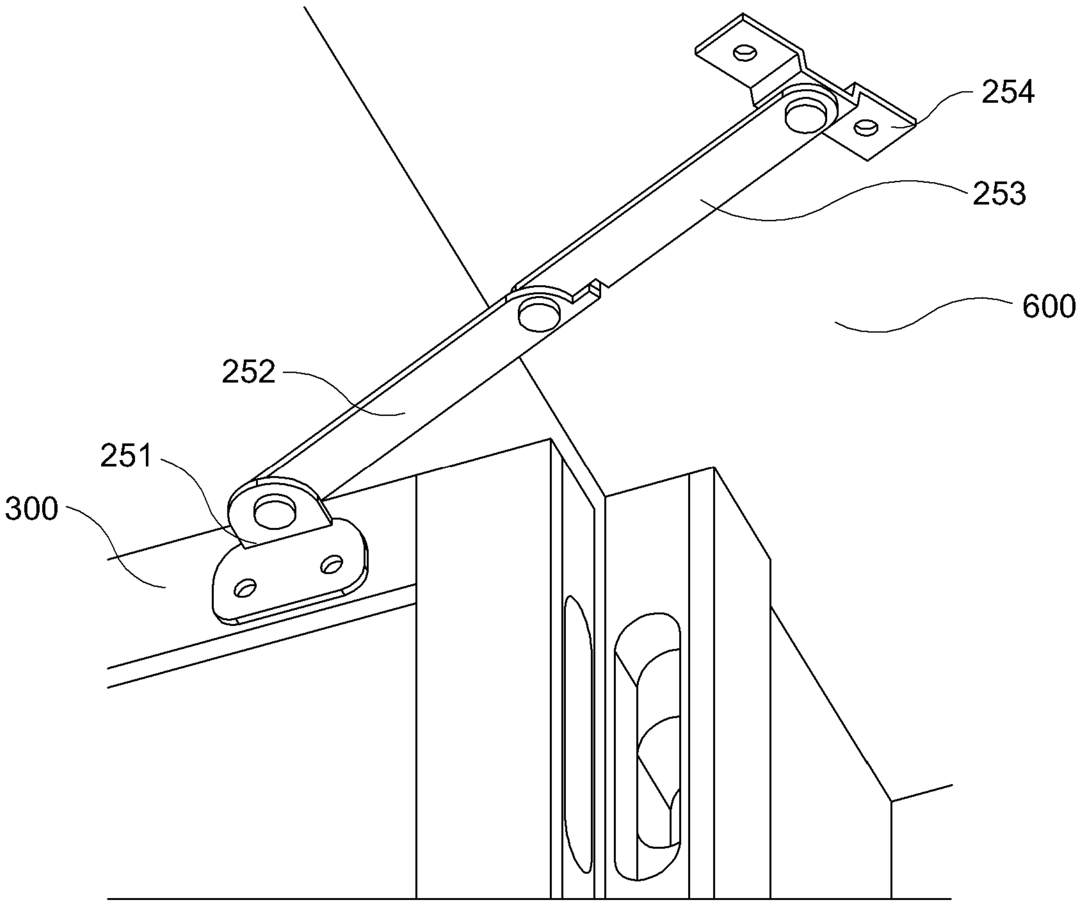
Figure 13:
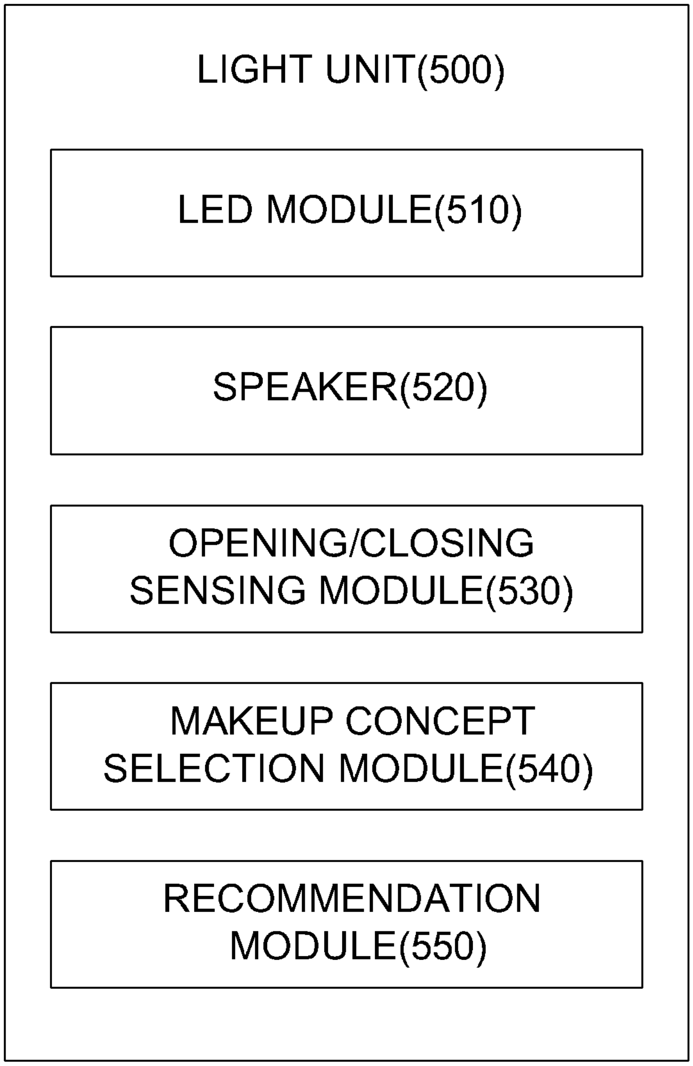
FIG. 13 is a view illustrating a light unit of the cosmetic container according to a preferred embodiment of the present disclosure.
Figure 14:
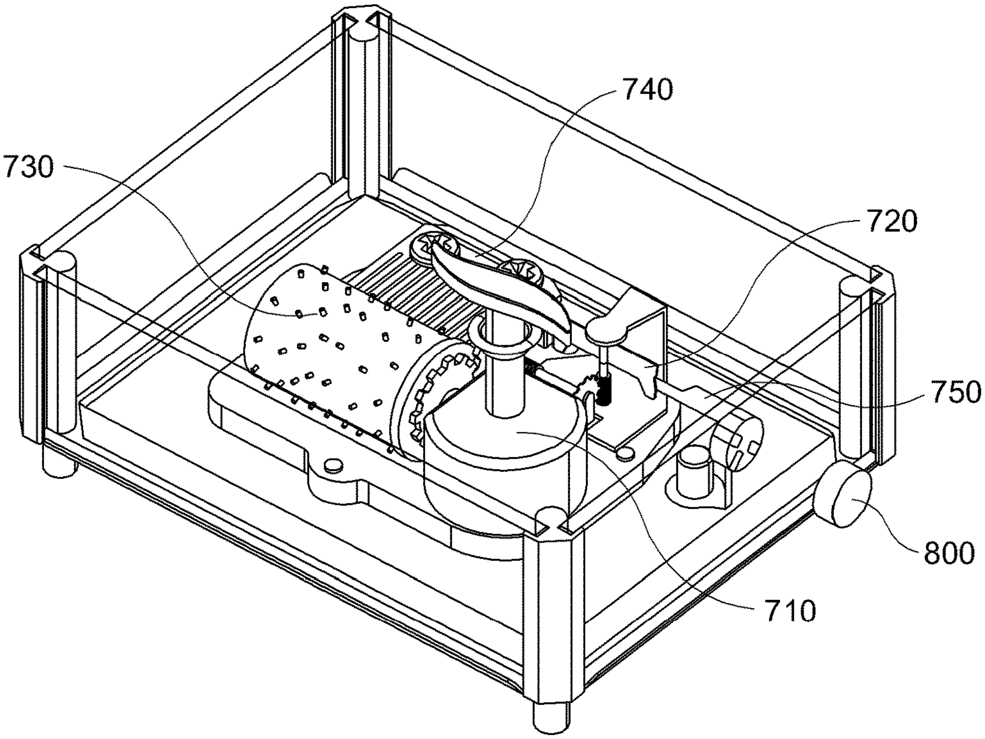
FIG. 14 to FIG. 16 are views illustrating a music box of the cosmetic container according to a preferred embodiment of the present disclosure.
Figure 15:
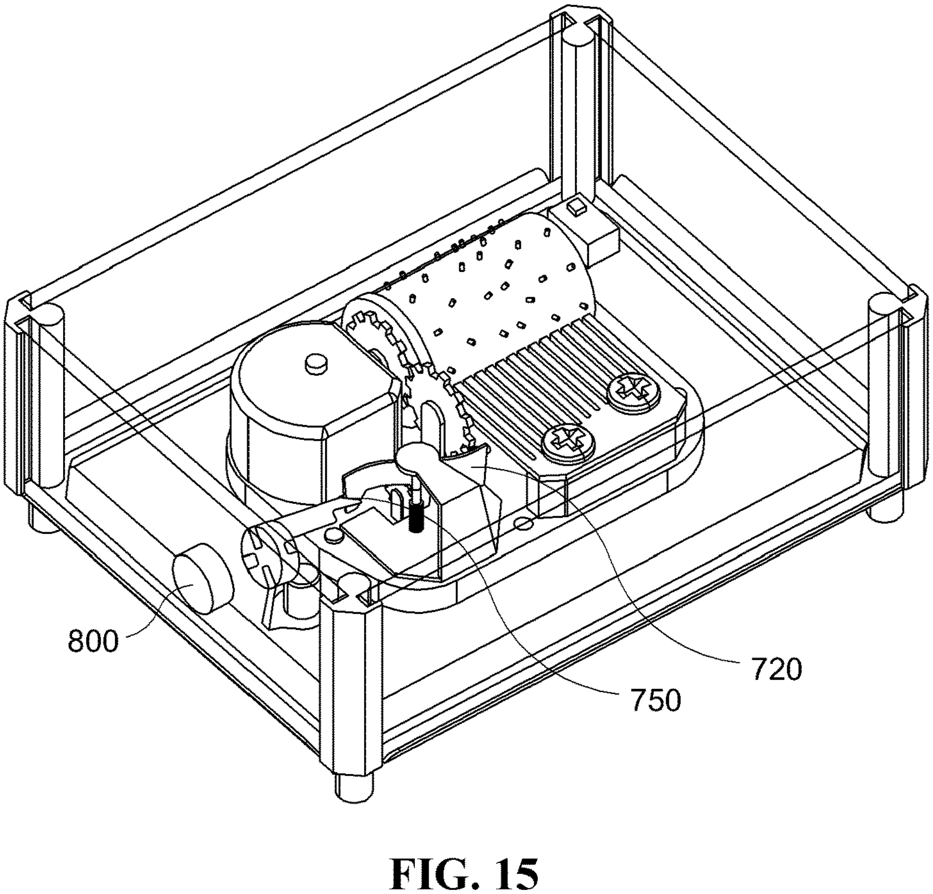
Figure 16:
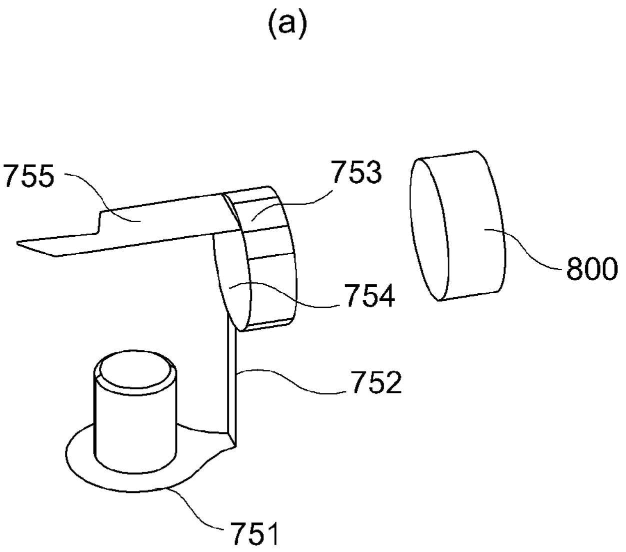

FIG. 1 to FIG. 4 are views illustrating the entire configuration of a cosmetic container according to a preferred embodiment of the present disclosure, FIG. 5 is a view illustrating a casing of the cosmetic container according to a preferred embodiment of the present disclosure, FIG. 6 to FIG. 12 are views illustrating a hinge unit of the cosmetic container according to a preferred embodiment of the present disclosure, FIG. 13 is a view illustrating a light unit of the cosmetic container according to a preferred embodiment of the present disclosure, and FIG. 14 to FIG. 16 are views illustrating a music box of the cosmetic container according to a preferred embodiment of the present disclosure.

A cosmetic cabinet according to an embodiment of the present disclosure, first, includes a casing 100 that has an array space 150 formed therein by a bottom plate 110, a back plate 120, a top plate 130, and side plates 140 and in which cosmetics are arrayed or kept.

In this configuration, the cosmetic cabinet includes a door unit 300 coupled to the casing 100 through hinge units 200 and opening/closing the array space 150. In this configuration, it would be preferable that the door unit 300 is provided in an L shape.

In this configuration, the cosmetic cabinet includes a storage unit 400 composed of a drawer casing 410 and a drawer 420 that can slide in the drawer casing under the array space 150.

Further, the cosmetic cabinet includes a light unit 500 in which an LED module 510 emitting light to the array space 150 and a speaker 520 equipped with a built-in Bluetooth module are integrated, and a light storage unit 600 disposed over the array space 150 and coupled with the light unit 500 therein.

In this configuration, the light unit may be connected with a remote controller and controlled by operation of the remote controller.

Meanwhile, the cosmetic cabinet includes a music box 700 disposed in the internal space of the drawer 420 and operating when the internal space is opened by sliding the drawer 420, and a fixed magnetic body 800 fixed to the drawer casing 410 and controlling operation of the music box 700 in accordance with the position of the drawer 420.

Further, the cosmetic cabinet includes a refrigeration system that provides cold air to the array space 150 to maintain the temperature and humidity of cosmetics arrayed or kept in the array space 150.

In this configuration, it would be preferable that a cooling pad module producing cold air is disposed in the casing 100 and operating in accordance with necessity or the refrigeration system is configured to discharge heat kept in the casing 100 out of the casing 100 using a fan.

In this configuration, a partition plate 151 partially dividing the array space 150 is disposed in the array space 150 and a mirror is disposed on each of the front surface of the partition wall 151 and the inner surface of the door unit 300.

In this configuration, it is preferable that the hinge unit 200 is composed of, in a pair, hinge bodies 210 embedded in the side plate 140 and the door unit 300, respectively, to couple the side plate 140 and the door unit 300 to each other, and a rotary member 220 rotatably coupled to the hinge bodies 210.

In this configuration, the hinge body 210 is composed of a main body 211 and wing bodies 212 extending from the upper end and the lower end of the main body 211, the main body 211 has a first hinge rotation shaft 213 to which a first end of the rotary member 220 is rotatably coupled, and the wing body 212 has a second hinge rotation shaft 214 to which a second end of the rotary member 220 is rotatably coupled.

Further, it is preferable that the rotary member 220 is composed of a base body 221 having a first through-hole 221*a* to be coupled to the first hinge rotation shaft 213 and one or more sub-body 222 extending from an end of the base body 221 and having a second through-hole 222*a* to be coupled to the second hinge rotation shaft 214.

That is, the rotary member 220 is a member coupled to both of a pair of hinge bodies 210 and it is preferable that the rotary member 220 is also provided in a pair similar to the hinge bodies 210.

In this configuration, the sub-body 222 has a first coupling support surface 222*c* having a third through-hole 222*b* to which a third hinge rotation shaft 230 is coupled so that the pair of sub-bodies 222 coupling across each other are coupled to each other, and a second coupling support surface 222*d* perpendicularly extending from an end of the first coupling support surface 222*c* and having the second through-hole 222*a*.

Meanwhile, the main body 221 may have a guide rail 221*a* so that the first hinge rotation shaft 213 can be inserted and fixed therein, and the wing body 212 may have a detachable plate 212*a* detachably coupled to the front surface of the wing body 212.

In this configuration, it is preferable that coupling protrusions 240 coupled to the wing body 212 and having a semicircular coupling groove 241 formed to partially correspond to the shape of the second hinge rotation shaft 214 are formed on the rear surface of the detachable plate 212*a*.

That is, when the door 300 is open, the first coupling support surface 222*c* and the second coupling support surface 222*d* cross each other, thereby easily supporting the weight of the door unit 300 and the mirror. As a result, it is possible to stably open and close the door unit 300 and easily support the weight of the door unit 300 when opening and closing the door unit 300.

In this configuration, the hinge unit 200 has an assistant hinge 250 composed of a first coupling member 251 coupled to the inner surface of the upper end portion of the door unit 300, a first hinge plate 252 having a first end coupled to the first coupling member 251, a second hinge plate 253 having a first end coupled to a second end of the first hinge plate 252, and a second coupling member 254 coupled to the bottom of the light storage unit 600 and coupled to a second end of the second hinge plate 253, thereby being able to additionally assists the opening/closing operation of the door unit 300.

In this configuration, the light unit 500 further includes an opening/closing sensing module 530 that senses opening and closing of the door 300, so the LED module 510 and the speaker 520 are operated only when the door unit 300 is opened.

In this configuration, the opening/closing sensing module 530 is composed of a first member disposed at the upper end of the door unit 300 and a second member disposed at the lower end of the light storage unit 600 close to the first member, so opening of the door unit 300 is determined when the door unit 300 is opened and the first member and the second member are moved away from each other.

In this configuration, it is preferable that the first member and the second member are magnets having different poles. That is, when the first member and the second member are moved away from each other, the magnetic force decreases, and when the magnetic force decreases, it is determined that the door 300 is open.

Further, the light unit 500 includes a makeup concept selection module 540 composed of a first makeup concept switch, a second makeup concept switch, and a third makeup concept switch, and may include a recommendation module 550 such that the LED module 510 and the speaker 520 are operated in correspondence to a concept set by the makeup concept selection module 540.

In this configuration, the first makeup concept switch is provided for an ordinary concept such that when the first makeup concept switch is operated, the recommendation module 550 enables the LED module 510 to emit light similar to the natural light and the speaker 520 to play pop music with soft rhythms or nature sounds, the second makeup concept switch is provided for a date concept such that when the second makeup concept switch is operated, the recommendation module 550 enables the LED module 510 to emit subtle light such as candlelight and the speaker 520 to play ballad music or jazz music, and the third makeup concept switch is provided for a party concept such that when the third makeup concept switch is operated, the recommendation module 550 enables the LED module 510 to repeatedly emit a plurality of different types of light and the speaker 520 to play electronic or upbeat music.

That is, a user can make up to be suitable for desired atmospheres or styles using music and light linked through the first to third makeup concept switches and can also create atmospheres from the user can feel comfort and confident.

In this configuration, the music that is played through the speaker 520 may be played by music files that are provided by a device linked with the Bluetooth module and it is also possible to selectively play music stored in a music storage module disposed in the light unit.

Further, it is preferable that the music box 700 is composed of a power transmitter 720 that is rotated by power transmitted through a power generator 710, a drum 730 that is rotated by power transmitted through the power transmitter 720, a player 740 that is operated in contact with the drum 730, and a stopper 750 that limits power that is transmitted to the drum 730 by stopping operation of the power transmitter 720.

In this configuration, the stopper 750 is composed of a supporting plate 751, an elastic plate 752 extending from an end of the supporting plate 751 and being perpendicular to the supporting plate 751, a coupling plate 754 coupled to an end of the elastic plate 752 and coupled with a moving magnetic body 753 being movable forward and backward by the fixed magnetic body 800, and a moving plate 755 extending from an end of the coupling plate 754 and being parallel with the supporting plate 751.

In this configuration, a first cutting line 755*a* that prevents damage to the power transmitter 720 by attenuating shock, which is generated when the moving plate 755 moves forward and comes in contact with the power transmitter 720 that is rotating, may be provided at an end of the moving plate 755.

In this configuration, the term 'forward' means the longitudinal advancing direction of the moving plate 755.

Further, the fixed magnetic body 800 and the moving magnetic body 753 have the same pole, so when the fixed magnetic body 800 and the moving magnetic body 753 come close to each other, the moving magnetic body 753 can be moved forward by magnetic force of repulsion.

That is, when the moving magnetic body 753 is moved forward, the moving plate 755 is moved forward, whereby operation of the power transmitter 720 is stopped.

Meanwhile, the magnetic force of repulsion is larger than the restoring force of the elastic plate 752, so when the fixed magnetic body 800 and the moving magnetic body 753 come close to each other, the upper portion of the elastic plate 752 is moved forward, whereby the moving magnetic member 753 can be moved forward.

In other words, when the drawer 420 is opened forward, the fixed magnetic body 800 and the moving magnetic body 753 are moved away from each other, so the music box 700 plays music. Further, when the drawer 420 is moved backward and closed, the fixed magnetic body 800 and the moving magnetic body 753 are moved close to each other, the music box 700 stops operation and music is stopped.

Further, when music box 700 includes a controller composed of a database that stores first music information of the volume, intensity, and running time of music to be played through the player 740, a music learning module that learns second music information that is information of the volume, intensity, and running time of music that is being played through the player 740, an error calculation module that calculates an error by comparing the first music information and the second music information with each other, and a maintenance module that turns on an LED when an error calculated by the error calculation module exceeds a preset range.

For example, when it is determined that music of second music information is higher in tone than music stored in the second music information, the LED of the maintenance module is turned on. Accordingly, it is possible to intuitionally recognize necessity of repair of the music box.

In this configuration, it is preferable that the LED shows a yellow color when it is determined that the tones of music sounds are different, shows a red color when it is determined that the intensities are different, and shows a blue color when it is determined that the running times are different. That is, it is possible to easily repair the music box by checking the player when a yellow color is turned on, the drum when a red color is turned on, the rotation controller when a blue color is turned on.

Further, the controller includes a music correction module that computes one or more of current humidity or current temperature when an error calculated by the error calculation module exceeds a preset range, and nullifies an error calculated by the error calculation module when the computed current humidity or current temperature is different over a preset range from set humidity or set temperature.

For example, when the error calculation module determines that music of the second music information is lower in tone than music stored in the second music information, the current temperature is 33 degrees, the current humidity is 80%, set temperature is 21 degrees, set humidity is 20%, and temperature and humidity of a preset range is 5 degrees and 30%, respectively, the music correction module nullifies an error calculated by the error calculation module because the current temperature and humidity exceed the ranges of the set temperature and humidity.

That is, it is possible to diagnose the accuracy of the error calculation module in consideration of variation of external environmental factors through the music correction module, so it is possible to prevent unnecessary maintenance or repair of the music box.

Preferred embodiments of the present disclosure were described above, but it would be understood by those skilled in the art that these embodiments described above are only examples of the spirit of the present disclosure and the present disclosure may be changed in various ways without departing from the spirit of the present disclosure. Accordingly, the protective range of the present disclosure should be construed by those described in claims rather than specific embodiments and all spirits within a corresponding range should also be construed as being included in the right range of the present disclosure.

What is claimed is:

1. A cosmetic cabinet comprising:

a casing defining an array space therein, the array space bounded by a bottom plate, a back plate, a top plate, and side plates and configured to contain cosmetics arrayed or kept therein;

a door coupled to the casing through at least one hinge assembly and configured to open and close the array space;

a storage compartment including a drawer casing and a drawer configured to be slidable in the drawer casing under the array space;

a light assembly including an LED module configured to emit light to the array space and a speaker equipped with a built-in short-range wireless communication module;

a light storage housing disposed over the array space and coupled with the light assembly therein;

a music box disposed in an internal space of the drawer and configured to operate when the internal space is opened by sliding the drawer; and a fixed magnetic body fixed to the drawer casing and controlling operation of the music box in accordance with a position of the drawer, wherein a partition plate partially dividing the array space is disposed in the array space and a mirror is disposed on each of a front surface of the partition plate and an inner surface of the door, wherein the music box includes a power transmitter configured to rotate by a power transmitted through a power generator, a drum configured to rotate by the power transmitted through the power transmitter, a player configured to operate in contact with the drum, and a stopper configured to limit the power transmitted to the drum by stopping operation of the power transmitter, wherein the stopper includes a supporting plate, an elastic plate extending from an end of the supporting plate and oriented perpendicular to the supporting plate, a coupling plate disposed on an end of the elastic plate and coupled with a moving magnetic body, the moving magnetic body configured to move forward and backward by the fixed magnetic body, and a moving plate extending from an end of the coupling plate in a parallel orientation relative to the supporting plate, wherein the fixed magnetic body and the moving magnetic body have a same pole to move the moving magnetic body forward by magnetic force of repulsion when the fixed magnetic body and the moving magnetic body come close to each other, wherein the moving plate is configured to move forward to stop operation of the power transmitter when the moving magnetic body is moved forward, and wherein the magnetic force of repulsion is greater than a restoring force of the elastic plate to move an upper portion of the elastic plate forward when the fixed magnetic body and the moving magnetic body come close to each other, thereby moving the moving magnetic body forward.

2. The cosmetic cabinet of claim 1, wherein the LED module and the speaker are configured to operate only when the door is opened.

3. The cosmetic cabinet of claim 2, wherein the at least one hinge assembly includes a pair of hinge bodies embedded in the side plate and the door, respectively, and coupling the side plate and the door to each other, and a rotary member rotatably coupled to the pair of hinge bodies; and each of the pair of hinge bodies includes a main body and wing bodies extending from an upper end and a lower end of the main body.

4. The cosmetic cabinet of claim 3, wherein the main body has a first hinge rotation shaft to which a first end of the rotary member is rotatably coupled;

the wing body has a second hinge rotation shaft to which a second end of the rotary member is rotatably coupled; and the rotary member includes a base body having a first through-hole to be coupled to the first hinge rotation shaft and one or more sub-body extending from an end of the base body and having a second through-hole to be coupled to the second hinge rotation shaft.

5. The cosmetic cabinet of claim 4, wherein the at least one hinge assembly has an assistant hinge including a first coupling member coupled to an inner surface of an upper end portion of the door, a first hinge plate having a first end coupled to the first coupling member, a second hinge plate having a first end coupled to a second end of the first hinge plate, and a second coupling member coupled to a bottom of the light storage housing and coupled to a second end of the second hinge plate.

* * * * *